(12) United States Patent
Stephan et al.

(10) Patent No.: US 6,342,770 B1
(45) Date of Patent: Jan. 29, 2002

(54) METHOD FOR STARTING BRUSHLESS DC MOTORS

(75) Inventors: Waldemar Stephan, Dortmund; Steffen Katzer, Sprockhövel, both of (DE)

(73) Assignee: Wilo GmbH, Dortmund (DE)

( * ) Notice: Subject to any disclaimer, the term of this patent is extended or adjusted under 35 U.S.C. 154(b) by 0 days.

(21) Appl. No.: 09/634,913

(22) Filed: Aug. 9, 2000

(30) Foreign Application Priority Data

Aug. 9, 1999 (DE) .......................... 199 36 755

(51) Int. Cl.$^7$ .................................. H02P 6/02
(52) U.S. Cl. ........................ 318/254; 318/430
(58) Field of Search ................ 318/254, 478, 318/479, 430, 431, 437, 439, 778, 779, 798, 799, 802, 805, 807–812

(56) References Cited

U.S. PATENT DOCUMENTS

| | | | |
|---|---|---|---|
| 5,206,567 A | * 4/1993 | Sakurai et al. | 318/254 |
| 5,327,052 A | * 7/1994 | Sakurai et al. | 318/254 |
| 6,118,238 A | * 9/2000 | Munro et al. | 318/141 |

FOREIGN PATENT DOCUMENTS

| | | |
|---|---|---|
| DE | 3342 448 | 6/1985 |
| DE | 4438 569 | 5/1996 |
| DE | 195 35 135 | 2/1997 |
| JP | 7-0135795 | 5/1995 |

* cited by examiner

*Primary Examiner*—Khanh Dang
(74) *Attorney, Agent, or Firm*—Lowe Hauptman Gilman & Berner, LLP

(57) ABSTRACT

Disclosed is a method of starting an electronically commutated DC motor including a stator having at least one winding and a rotor. The winding is excited with at least one initial start pulse having a voltage and a repetition frequency which are sufficient to ensure rotation of the rotor under a maximum load in normal operation. Back EMF generated in the winding by the rotation of the rotor is detected. If the back EMF is detected, the rotation of the motor is controlled based on the detected back EMF. If the back EMF is not detected, the voltage of the at least one initial start pulse is increased until any of (i) the back EMF is detected, (ii) a current generated in the winding by said at least one initial start pulse reaches a maximum acceptable current level, and (iii) the voltage of said at least one initial start pulse reaches a maximum acceptable voltage level. In the latest instance, supply of the at least one initial start pulse to the winding is discontinued.

14 Claims, 1 Drawing Sheet

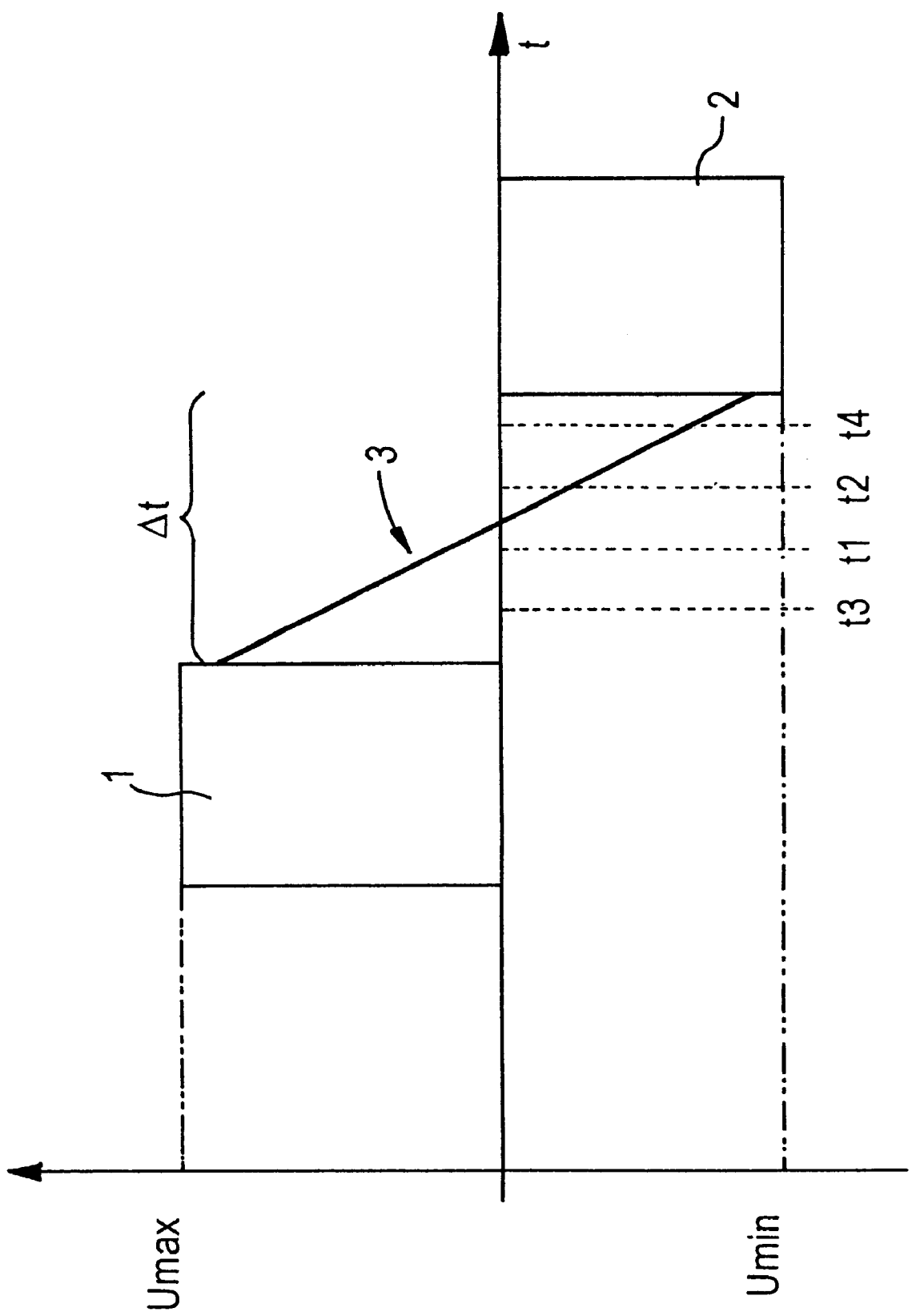

METHOD FOR STARTING BRUSHLESS DC MOTORS

The present invention relates to a method for starting an electronically commutated DC motor comprising a stator fitted with a least one and in particular three windings and a rotor fitted with permanent magnets, the winding being excited during the start phase by means of start pulses of predetermined voltage and predetermined repetition frequency, and wherein the opposing induced voltage being measured.

So-called brushless DC motors gain increasingly in significance as economical and reliable semiconducting elements are being developed. In these motors the voltage commutation is implemented—not by brush contacts as heretofore, but by controlled switching of semiconductors. To enable the microprocessor to accurately coordinate the switching processes, it must be fed with information on the instantaneous rotor position. For that purpose the position of the magnets in the rotor is ascertained either using Hall effect elements, or by the back emf [BEMF] induced by the magnets in the stator windings, the latter method being more economical than the former.

Motors operating with BEMF measurements incur the problem that at low motor speeds and foremost when starting the motor, such measurements fail on account of the minute magnitudes of the then BEMF signals. Illustratively start procedures are known wherein the windings are driven "blind" during the start phase in synchronous operation along the v/f curve until the BEMF shall be detectable. Thereafter the sensor-free control by means of BEMF will supersede. However such a procedure is strongly dependent on the kind of motor.

Further procedures are known, wherein the exciting currents are controlled in such manner already upon slight rotor displacements that it is feasible to measure very low BEMF's in the current-free phase windings. However such procedures entail comparatively complex measurement and control electronics to assure reliable motor starting.

Therefore it is the objective of the present invention to create a method for starting brushless DC motors not requiring Hall sensors and allowing reliably starting various motor types with very simple technical material.

This problem is solved by a method defined in claim 1.

The heart of the invention is to energize the motor windings with start pulses entailing rotor rotation provided the rotor be free to move. For that purpose the start pulse voltages are selected in such manner that they would move the rotor even under its highest load. Therefore such a start pulse reliably causes rotation and the rotation generates a measurable BEMF in a winding. A microprocessor then uses this BEMF as the control variable controlling the current applied to the particular windings. As soon as the control using the start pulse(s) is effective, the pulse voltage and/or repetition frequency can be changed to a level at which the desired normal operation takes place. Thereupon the normal, sensor-free operation is initiated. Normal operation is foremost characterized in that each pulse is changed as a function of the measured BEMF in the windings.

In this manner the invention supplies the motor in its start phase with start pulses of higher voltage, and advantageously the current drain shall be noted in order to avoid overheating defects. If in spite of the higher start pulses no BEMF is detected, then said start pulses' voltage can be raised up to a maximally admissible level before deciding that the motor is locked and the electric supply shall be shut off. If the motor current drain in the start phase were to exceed a fixed maximum value, then advantageously the start pulse voltage shall be lowered. As soon as a BEMF can be detected, the repetition frequency and/or the voltage of the start pulses can be gradually matched to the commutation frequency and voltage required for normal operation.

The method of the invention is characterized by high reliability in the start phase. It can be implemented merely using the components already present in the motor's control electronics and consequently said method contributes to reducing costs in motor manufacture. It offers the special advantage that it is flexible enough to be adapted to many different types of motors.

In an advantageous embodiment variation of the method of the invention, the start pulses begin with the maximally admissible voltage at which the motor also shall rotate in all cases under maximum load. This feature offers the advantage that in the absence of a detected BEMF, the presence of motor locking can be ascribed to motor malfunction and the required steps may be taken. Advantageously the repetition frequency of the start pulses is lower than it would be under normal conditions. Because of the high reliability of this start procedure, the entailed abrupt and loud start operation is a justifiable tradeoff.

The rotor position at shutoff motor being uncertain, and the start procedure possibly leading to rotation in the wrong direction, especially in motors fitted with only one or two windings, advantageously the rotor shall be positioned using a first start pulse and thereafter the winding(s) shall be loaded with start pulses corresponding to the desired direction of rotation. Advantageously, to minimize the danger of starting in the wrong direction, the stator shall comprise at least two, and especially three windings.

To measure the BEMF as accurately as possible and with as little noise as possible, said BEMF is measured in the current-free interval between two start pulses. Measurement shall be initiated only after the voltage has been shut off. To obtain the most comprehensive possible information about rotor motion, the BEMF advantageously shall be measured at least twice, in particular once before and once after the halfway point in the current-free interval, that is once before and once after the expected null crossing. When appropriately selecting the measurement intervals, false alarms of malfunctioning can be ruled out. High procedural reliability is thereby assured.

In particularly advantageous manner, the method of the invention is applicable to brushless DC motors used to drive centrifugal pumps, especially with cans, and which especially are used in heating and airconditioning system in residences or motor vehicles.

A particular implementation of the method of the invention is elucidated below in relation to the attached drawing.

In the description to follow, control of such electronically commutated DC motors is presumed known. Illustratively such motors are fitted with an eight-pole, permanent-magnet rotor of which the three windings are delta-wired. Commutation is carried out by a controller in the form of a microprocessor which in this instance drives six power transistors and by means of them applies the current to the windings in series. Rotor rotation induces in these windings back emf s (BEMF's) which can be measured at the phase windings and which characterize the rotor position.

The drawing shows how in the start phase and by means of two time-separated start pulses 1 and 2 of voltages $U_{max}$ and $U_{min}$ current is made to pass through a winding to cause the rotor to rotate. The voltage pulses of this illustration are square. At the end of pulse 1, the BEMF 3—shown idealized—is measured within the time interval $\Delta t$. In this instance the BEMF is measured at two instants t1 and t3 before the null crossing and at two instants t2 and t4 after the null crossing which is situated approximately at the middle of the time interval Δt.

When motor starts in proper form, the voltages measured at said instants need only satisfy the following rules:

$$U(t1)>(U_{max}-U_{min})/2$$

$$U(t2)<(U_{max}-U_{min})/2$$

$$U(t3)>U(t1)$$

$$U(t4)<U(t2).$$

If the BEMF slope were ascending, the above conditions must be reversed.

What is claimed is:

1. A method of starting an electronically commutated DC motor including a stator having at least one winding and a rotor, said method comprising the steps of:
   (a) exciting the winding with at least one initial start pulse having a voltage and a repetition frequency which are sufficient to ensure rotation of the rotor under a maximum load in normal operation;
   (b) detecting back EMF generated in the winding by the rotation of the rotor; and
      (c1) if the back EMF is detected, controlling the rotation of the rotor based on the detected back EMF;
      (c2) if the back EMF is not detected, increasing the voltage of said at least one initial start pulse until any of (i) the back EMF is detected, (ii) a current generated in the winding by said at least one initial start pulse reaches a maximum acceptable current level, and (iii) the voltage of said at least one initial start pulse reaches a maximum acceptable voltage level, wherein, in the latest instance, supply of said at least one initial start pulse to the winding is discontinued.

2. The method as claimed in claim 1, further comprising the step of increasing the repetition frequency, instead of the voltage, of said at least one initial start pulse once the current in the winding has reached the maximum acceptable current level.

3. The method as claimed in claim 2, further comprising the step of decreasing the voltage of said at least one initial start pulse once the current in the winding has reached the maximum acceptable current level.

4. The method as claimed in claim 1, further comprising the step of indicating abnormal operation of the motor when the supply of said at least one initial start pulse to the winding is discontinued.

5. The method as claimed in claim 1, wherein the voltage of said at least one initial start pulse is at a maximum level at which the rotation of the motor is ensured under the maximum load in normal operation.

6. The method as claimed in claim 1, wherein said step (c1) comprises supplying to the winding a series of subsequent pulses having a voltage and a repetition frequency gradually matched to an actual commutation frequency and an actual voltage, respectively, required for normal operation of the motor under an actual load.

7. The method as claimed in claim 6, wherein the voltage and repetition frequency of said subsequent pulses are changed in response to changes in the detected back EMF.

8. The method as claimed in claim 1, wherein, before said step (a), a positioning pulse is supplied to the winding to position the rotor.

9. The method as claimed in claim 1, wherein said at least one initial start pulse has a polarity corresponding to a desired direction of rotation of the rotor.

10. The method as claimed in claim 1, wherein said step (b) is performed by measuring the back EMF during current-free intervals of said at least one initial start pulse when no voltage is supplied to the winding.

11. The method as claimed in claim 10, wherein the back EMF is measured at least twice during each of the current-free intervals, once before and once after the middle of said current-free interval.

12. The method as claimed in claim 11, wherein the back EMF is measured during said current-free interval, between a first pulse of a first voltage U1 and a second pulse of a second voltage U2, at instants t1 and t2 before and t3 and t4 after the middle of said current-free interval, the back EMF measured at said instants t1, t2, t3 and t4 are U(t1), U(t2), U(t3), U(t4), respectively, the back EMF is detected if U(t1)>(U1−U2)/2;

U(t2)<(U1−U2)/2;

U(t3)>U(t1); and

U(t4)<U(t2) for U1>U2.

13. The method as claimed in claim 12, wherein the back EMF is detected if

U(t1)<(U1−U2)/2;

U(t2)>(U1−U2)/2;

U(t3)<U(t1); and

U(t4)>U(t2) for U1<U2.

14. The method as claimed in claim 1, wherein the stator has three windings.

* * * * *